United States Patent [19]

Siwiak et al.

[11] Patent Number: 5,239,306
[45] Date of Patent: Aug. 24, 1993

[54] DUAL MODE RECEIVER HAVING BATTERY SAVING CAPABILITY

[75] Inventors: Kazimierz Siwiak; Clifford D. Leitch, both of Coral Springs; Robert J. Schwendeman, Pompano Beach, all of Fla.

[73] Assignee: Motorola, Inc., Schaumburg, Ill.

[21] Appl. No.: 956,562

[22] Filed: Oct. 5, 1992

Related U.S. Application Data

[63] Continuation of Ser. No. 633,585, Dec. 24, 1990, abandoned.

[51] Int. Cl.⁵ .............................................. H04B 7/00
[52] U.S. Cl. ............................ 340/825.44; 340/311.1; 340/825.48
[58] Field of Search ........... 340/311.1, 825.44, 825.47, 340/825.48; 375/5; 455/38.1, 38.3, 142, 143, 343, 33.4

[56] References Cited

U.S. PATENT DOCUMENTS 4,918,437  4/1990  Jasinski et al. .................... 455/33.4
5,054,052  10/1991  Nonami ............................ 455/343

Primary Examiner—Donald J. Yusko
Assistant Examiner—Dervis Magistre
Attorney, Agent, or Firm—Philip P. Macnak; William E. Koch; Thomas G. Berry

[57] ABSTRACT

A dual mode communication receiver a receiver for receiving information transmitted in a first and second modulation format on a common channel, a first demodulator for detecting information transmitted in the first modulation format, and a second demodulator, responsive to the information detected in the first modulation format, for detecting information transmitted in the second modulation format. A power conservation circuit is also provided for selectively supplying power to the first and second demodulators for enabling the detecting of the information transmitted in the first modulation format and the second modulation format, respectively.

35 Claims, 7 Drawing Sheets

DUAL MODE RECEIVER HAVING BATTERY SAVING CAPABILITY

This is a continuation of application Ser. No. 07/633,585, filed Dec. 24, 1990 now abandoned.

BACKGROUND OF THE INVENTION

1. Field of the Invention

This invention relates to the field of communication receivers, and more particularly to a selective call communication receiver providing high speed data and voice communication with battery saving capability.

2. Description of the Prior Art

There are many communication systems in operation today, including virtually all of today's paging systems, which utilize frequency (FM) modulation for addressing, and for data and voice transmission. The current communication receivers, including paging receivers, utilize sophisticated receiver architectures, and today's paging systems utilize well known and established signaling formats. The current receiver architectures and signaling formats have been optimized to provide both high receiver sensitivities and excellent battery saving capabilities.

In many metropolitan areas, many paging systems were being operated at, or near, the maximum system capacity, in both the number of subscribers that can be accommodated, and the message transmission time that was available. Such paging system operation has resulted in reduced customer satisfaction due to extended holding, or "camp-on" times required to access the paging system, and also due to extended delays in message delivery due to equally extended paging system message transmission queues. In an effort to improve the message throughput in such prior art systems, such services as voice paging, were eliminated on many systems, and were replaced by newer services, such as numeric and alphanumeric messaging. These newer services greatly increased the number of subscribers which could be accommodated on the paging system, by greatly reducing the air-time requirements for message transmission. However, as the demand for even more improved paging services has increased, such as for improved methods for handling and processing large alphanumeric data messages, many paging systems are again nearing the maximum system capacity. In an effort to continue to improve the grade of service being provided in such paging systems, new signaling formats, such as the 1200 baud POCSAG signaling format, have been implemented to ease the burden on the paging system by providing ever increasing message throughput.

When used in simulcast transmission systems, standard FM modulation is not suitable for data transmission at high bit rates due to transmitter equalization problems. Because of the limitations of FM modulation for high speed message transmission, other forms of modulation, such as linear modulation techniques are required to provide for transmission at the higher data rates. While linear modulation techniques are available to provide the increased message transmission speeds, such modulation techniques generally are incompatible for use with existing receiver architectures, are incompatible with present day signaling protocols, and require significantly more current drain for operation than required for circuits receiving and demodulating existing signaling protocols transmitted using standard FM modulation techniques. There is a need to provide a receiver architecture which retains compatibility within existing FM modulated paging signaling protocols, thereby taking advantage of the battery saving capabilities of these existing paging signaling protocols. Furthermore, there is a need to provide a receiver architecture which includes linear demodulation for voice and high speed data capability, to provide the increased message throughput required for these ever expanding services, without compromising the battery saving performance of the existing paging signaling protocols.

SUMMARY OF THE INVENTION

In a first embodiment of the present invention, a dual mode communication receiver comprises means for receiving information transmitted on a common channel in a first and second modulation format, a first means for detecting the information transmitted in the first modulation format on the common channel, and a second means, responsive to the information detected in the first modulation format, for detecting the information transmitted in the second modulation format.

In a second embodiment of the present invention, a dual mode communication receiver comprises means for receiving information transmitted on a common channel in a first and second modulation format: first means for detecting the information transmitted in the first modulation format on the common channel and second means, responsive to the information detected in the first modulation format, for receiving the information transmitted in the second modulation format. A third means supplies power to the receiving means for enabling the receiving of the information transmitted in the first and second modulation formats, supplies power to the first means for enabling the detecting of the information transmitted in the first modulation format, and further in response to the information received and detected in the first modulation format, supplies power to the second means for enabling the detecting of the information transmitted in the second modulation format.

In a third embodiment of the present invention, a dual mode communication receiver comprises a means for receiving information transmitted in a FM modulation format and a linear modulation format. A first means for detecting detects the information transmitted in the FM modulation format, and second means for detecting, responsive to the information detected in the FM modulation format, detects the information transmitted in the linear modulation format.

In a fourth embodiment of the present invention, a dual mode communication receiver comprises a means for receiving information transmitted in a FM modulation format and a linear modulation format. A first means for detecting detects the information transmitted in the FM modulation format, and a second means for detecting, responsive to the information detected in the FM modulation format, detects the information transmitted in the linear modulation format. A third means supplies power to the receiving means for enabling the receiving of the information transmitted in the FM and linear modulation formats. The third means further supplies power to the first means for enabling the detecting of the information transmitted in the FM modulation format, and the third means further in response to the information detected in the FM modulation format, supplies power to the second means for enabling the detecting of the information transmitted in the linear modulation format.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
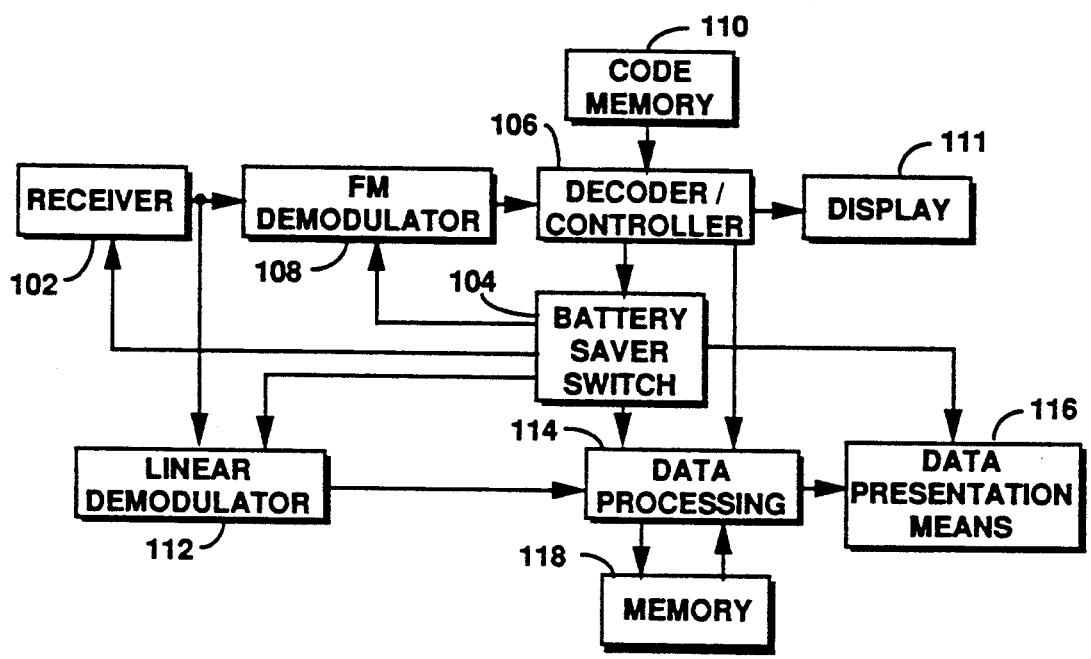
FIG. 1 is an electrical block diagram of the dual mode communication receiver of the present invention.

As has been described above, prior art communication systems, such as paging systems, have provided address and message transmission in a predetermined signaling protocol using a single modulation format. Analog signaling protocols, such as two tone and five tone signaling protocols, and analog voice messages were modulated using either phase or angle modulation formats, or a direct frequency modulation format in FM modulated carrier systems which are prevalent in the industry today. Other signaling protocols, such as digital signaling protocols, have typically utilized a frequency shift keying (FSK) modulation format for both the address and message transmissions. The existing signaling protocols, such as the POCSAG signaling protocol at 512 and 1200 bits per second, or the Golay Sequential Code protocol at 600 bits per second, were developed to provide superior performance in wide area communication systems, such as those systems providing simulcast message transmission. However, as previously described, there is a limit at which transmission of information at high data bit rates using an FM modulation format becomes impractical, due largely to problems encountered in equalizing simulcast transmission systems for such transmissions, and due to the frequency spectrum required to utilize conventional frequency modulation formats to provide such higher speed data communications.

Alternate modulation formats are available to provide improved throughput of message information. These alternate modulation formats include those modulation formats which are often termed linear modulation formats. Such linear modulation formats enable the modulation of the carrier signal whereby the message information is encoded in both the amplitude and the instantaneous phase angle of the carrier. Examples of linear modulation formats include, but are not limited to, quadrature amplitude modulation (QAM modulation), and spectrally efficient data modulation (SEDM modulation), such as described in U.S. Pat. No. 4,737,969 to Steel et al., entitled "Spectrally Efficient Digital Modulation Method and Apparatus" which is assigned to the assignee of the present invention and which is hereby incorporated by reference herein. Other forms of linear modulation include those modulation formats which simultaneously modulate both the amplitude and the phase of the transmitted signal to encode the message information, and also shape the transmitted spectrum to provide adjacent channel protection. An example of such modulation format is the QPSK signaling format. While such linear modulation formats are available for the transmission of message information at very high data rates, well in excess of that which can be provided by convention frequency modulation formats, such linear modulation formats are generally incompatible for use with the established paging signaling protocols which have been developed to provide both excellent receiver sensitivities and battery saving performance. This incompatibility is due largely to the requirement of providing linear receivers which require significantly more power to operate than that required for selective call receivers operating in paging systems which employ such well known signaling formats as the POCSAG, or Golay Sequential Code signaling protocols.

FIG. 1 is an electrical block diagram of a dual mode communication receiver of the present invention which overcomes the problems described, and which is compatible for use on existing paging systems, using existing paging signaling protocols. The dual mode communication receiver of the present invention, enables the transmission of data at very high data bit rates, such as eight kilobits per second and higher. The dual mode communication receiver of the present invention is compatible with the existing paging signaling protocols to provide excellent battery saving performance characteristics, and to maintain the receiver sensitivity characteristics of the prior art communication receivers using the conventional paging signaling protocols. The dual mode communication receiver of the present invention is capable of the operation described above by providing a first receiving means for receiving and detecting information transmitted in a first modulation format, such as in the conventional FM modulated format, and by providing a second receiving means which is responsive to the information detected by the first receiving means in the first modulation format for receiving and detecting information transmitted in a second modulation format, such as in one of the linear modulation formats which enables the high speed transmission of message information. The transmission format is described in FIGS. 2A–2C, and will be described in detail below. The transmission protocol of FIGS. 2A–2C enables the transmission of information which is modulated in a conventional FM modulation format, and further enables the transmission of message information which is modulated in a linear modulation format to enable high speed data transmission. Referring to FIG. 1, the information modulated in either the FM modulation format, or the linear modulation format, is received by receiver 102. A battery saving switch 104, under the control of a decoder/controller 106, supplies power to the receiver 102 to enable the reception of the transmitted information. The battery saving switch 104 also couples to an FM demodulator 108 to enable FM modulated information received by receiver 102 to be demodulated. The demodulated information is provided to the decoder/controller 106. A code memory 110 is provided which couples to the decoder/controller 106, and which stores address information assigned to the dual mode communication receiver. When an address is detected in the demodulated information which corresponds to the predetermined address information assigned to the communication receiver, one of two operations will occur, which will be described in greater detail below. In the first instance, the battery saving switch 104, under the control of the decoder/controller 106 will maintain the supply of power to the FM demodulator 108 to enable further demodulation of message information received in the FM modulation format. The received message information is temporarily stored in a memory, such as a random access memory, which is generally located within the decoder/controller 106. The stored message information is recalled by the user for display on display 111. The receiving operating and the decoding of the address information is well known to one of ordinary skill in the art.

However, unlike the prior art receivers, power to the FM demodulator 108 is suspended by battery saver switch 104, under the control of the decoder/controller 106, and power is then supplied to the linear demodulator 112, to enable the demodulation of information received in the second modulation format. The information received in the second modulation format is received by receiver 102, which then couples the received information to the linear demodulator 112. The demodulated message information is coupled from the output of the linear demodulator 112, to the input of a data processing unit 114. When the linear demodulator 112 is enabled, battery saving switch 104 also supplies power to the data processing unit 114, and to the data presentation means 116. The decoder/controller 106 is coupled to the data processing circuit 114, enabling the data processing circuit 114 to process the message information received in the second modulation format. The processed message information is temporarily stored in memory 118, and can be recalled by the user and displayed on the presentation means 116.

Figure 2A:
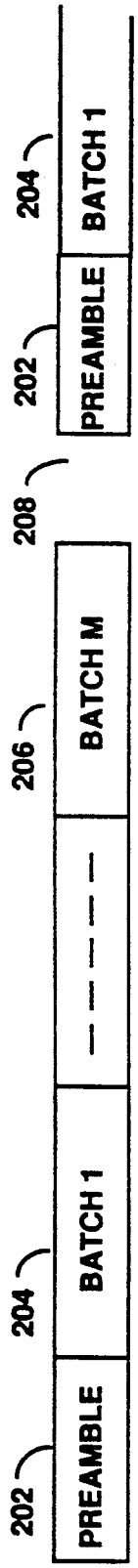
FIGS. 2A and 2B are timing diagrams describing the preferred signaling format for the dual mode communication receiver of the present invention.
Figure 2B:
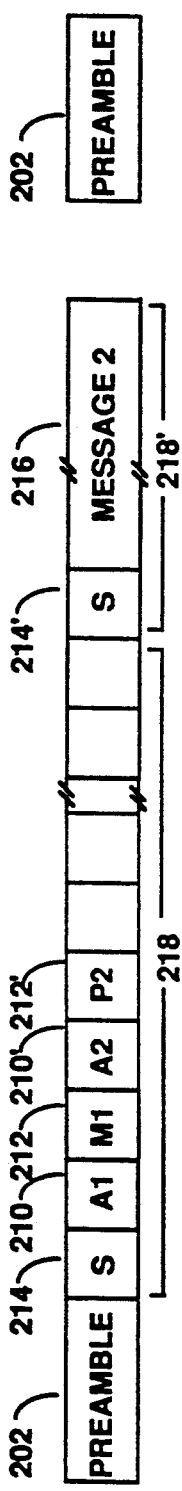

FIGS. 2A and 2B are timing diagrams describing the signaling format for the dual mode communication receiver of the present invention. As shown in FIG. 2A, when a message transmission is initiated on the channel, a preamble 202, modulated in the FM modulation format, is transmitted on the channel, followed by a plurality of message batches 204-206. Each of the message batches 204-206 has a predetermined transmission time interval, and enables the transmission of address and message information which is modulated in the FM modulation format, or for high speed data, which is modulated in a linear modulation format. The modulation of address and message information in the FM modulation format is well known in the art. The modulation of data in a linear modulation format, such as the SEDM modulation format, is described in U.S. Pat. No. 4,737,969 to Steel et al, entitled "Spectrally Efficient Digital Modulation Method and Apparatus" which is assigned to the assignee of the present invention, and which is incorporated by reference herein. All information transmitted in a given batch is modulated in a common modulation format. As will be described in further detail below, one or more batches of information are modulated in the FM modulation format and can be interleaved with one or more batches of information which are modulated in a linear modulation format. Depending upon the channel loading, a break 208 in the transmission can occur, after which the preamble 202 is again transmitted to enable the receivers to re-synchronize with the batch transmission.

FIG. 2B shows in further detail the interleaving of batches modulated in the FM modulation format with batches modulated in the linear modulation format. In the preferred embodiment of the present invention, the preamble 202 is a sequence of alternating one and zero bits which are modulated using the FM modulation format. The preamble 202 enables the receiver to awake from a battery saving time interval, recognize that a transmission on the channel has been initiated, and enables the receiver to obtain bit synchronization with the transmitted signal. Following the preamble 202 transmission, each batch comprises a synchronization code word 214, followed by address 210 and message 212 information, or by high speed data 216. The synchronization code word 214 is modulated in the modulation format appropriate for the type of data being transmitted in the batch, and enables synchronization with the transmitted information. In the example shown in FIG. 2B, the synchronization code word 214 is modulated in the FM modulation format, followed by addresses 210 and messages 212 which are also modulated in the FM modulation format. Each transmission batch is coded using a coded synchronization code word and allows for the transmission of a predetermined number of address and/or message information code words, which, as for example, is sixteen. As shown, the address 210 of a first receiver and the associated message 212 are transmitted, followed by the address 210' of a second receiver and the associated message 212', and so forth. Message 212' for the second receiver is not a normal message information code word, but is a predetermined "batch" pointer, directing the receiver to the transmission batch in which the high speed message information directed to the receiver is to be transmitted, which as shown is in the next transmission batch 218'. As shown, batch 218' contains the high speed message information 216 which is modulated in a linear modulation format. Batch 218' begins with the synchronization code word 214' which is used to signal the start of the message information, as will be described below. Following the transmission of batch 218', additional high speed message information can be transmitted in additional batches, other conventionally modulated address and message information can be transmitted in additional batches, or as shown, the batch transmission can be terminated until a later time when additional address and message information is available for transmission.

Figure 2C:
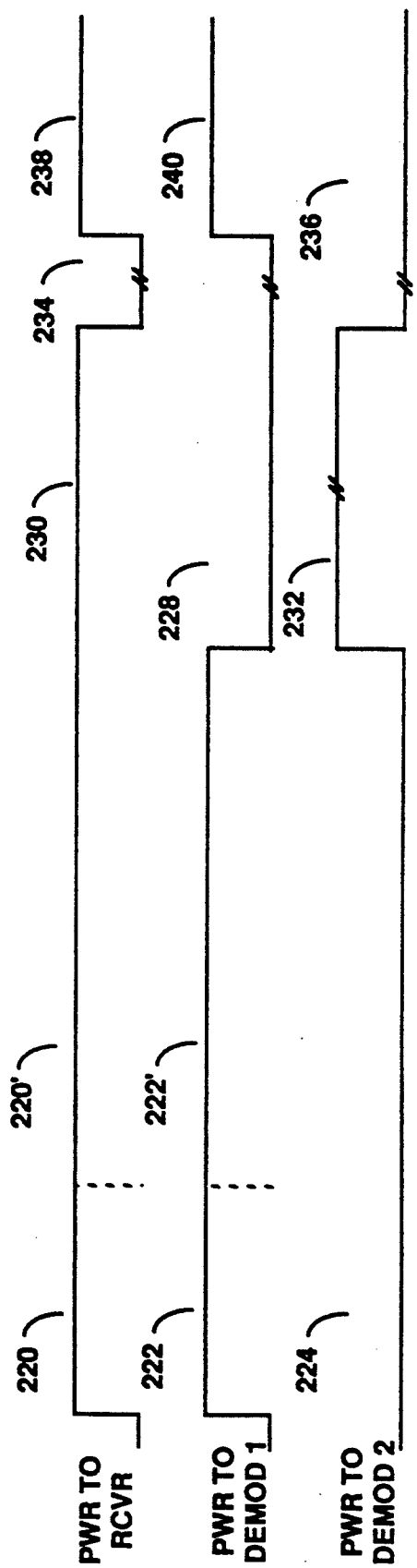
FIG. 2C is a timing diagram showing the battery saving operation of the dual mode receiver of the present invention.

FIG. 2C is a timing diagram describing the battery saver operation for the dual mode communication receiver of the present invention. Power is initially supplied to the receiver section, during time interval 220, and to the FM demodulator, during time interval 222, to enable receiving the preamble and synchronization code word information modulated in the FM modulation format. The supply of power to the linear demodulator is inhibited during time interval 224, thereby conserving power within the receiver. After having detected the preamble and synchronization code word, the supply of power to the receiver is maintained during time interval 220', and to the FM demodulator during time interval 222', in order to receive any additional address and message information transmitted in the first transmission batch. The supply of power to the receiver section is maintained during time interval 230 since the next transmission batch includes the high speed data directed to the receiver. However, the supply of power to the FM demodulator is suspended during time interval 228, and power is supplied to the linear demodulator, during time interval 232. After receiving the high speed data information during time interval 232, the supply of power is suspended during time interval 234 to the receiver section, and during time interval 236 to the linear demodulator. Power is again supplied to the receiver section during time interval 238, and to the FM demodulator, during time interval 240, to again enable reception of the message information in the next sequence of message batch transmissions.

In summary, power is regularly supplied to the receiver and to the FM demodulator to enable reception of an address and message information using a signaling protocol which provides battery saving capability to the receiver. When the message information indicates a high speed data transmission is forthcoming, the supply of power to the FM demodulator is suspended, and power is supplied to the linear demodulator to enable the reception of the high speed data. By supplying power to the linear demodulator and high speed data storage sections only during the transmission of high speed data, the receiver battery life can be greatly extended as compared to receiving all information in the linear modulation format.

Figure 2D:
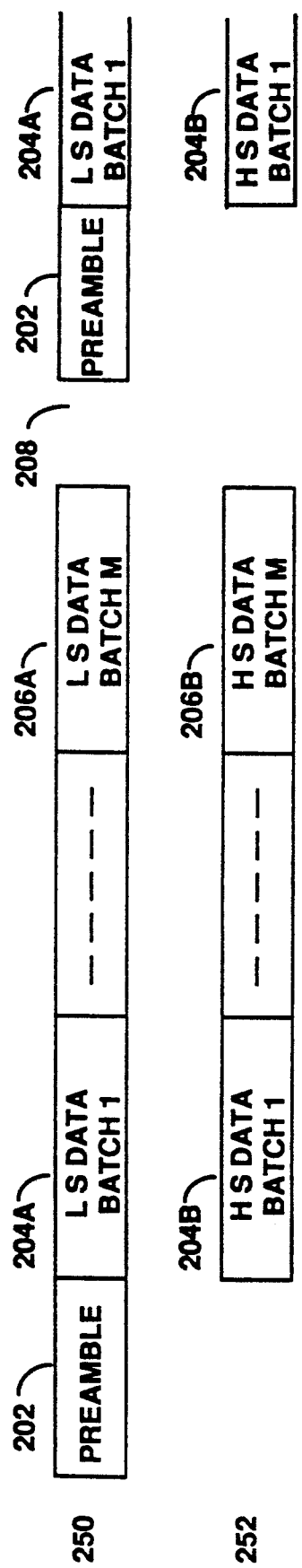
FIG. 2D is a timing diagram describing an alternate signaling format for the dual mode receiver of the present invention.

An alternate embodiment of the signaling format for the dual mode receiver of the present invention is shown in FIG. 2D. In this embodiment, information is transmitted on two channels, a first channel 250 which is utilized for the transmission of low speed message information modulated in an FM modulation format, and a second channel 252 which is utilized for the transmission of high speed message information modulated in a linear modulation format. The batches of low speed data 204A-206A overlay in time the batches of high speed data 204B-206B. The dual mode receiver of the present invention operates on the first channel receiving message information, which can include conventional numeric or alphanumeric messages intended for the dual mode receiver. When long alphanumeric messages or voice messages are to be transmitted, the message pointer information is transmitted on the first channel directing the dual mode receiver to a predetermined message batch to be transmitted on the second channel. After having received the pointer information, the dual mode receiver selects the second channel for receiving the high speed message information during the predetermined batch identified by the pointer. After having received the high speed message, the receiver again selects the first channel. The alternate embodiment of the present invention shown in FIG. 2D allows a very efficient method of mixing conventional paging receivers which receive information modulated in an FM modulation format, with the dual mode receivers of the present invention by maintaining all low speed message transmission on the first channel, and all high speed message transmission on the second channel. This enables the use of conventional signaling formats to be utilized for the transmission of information in the batches 204A-206A on the first channel, enabling both conventional receivers and dual mode receivers to be readily intermixed.

Figure 3:
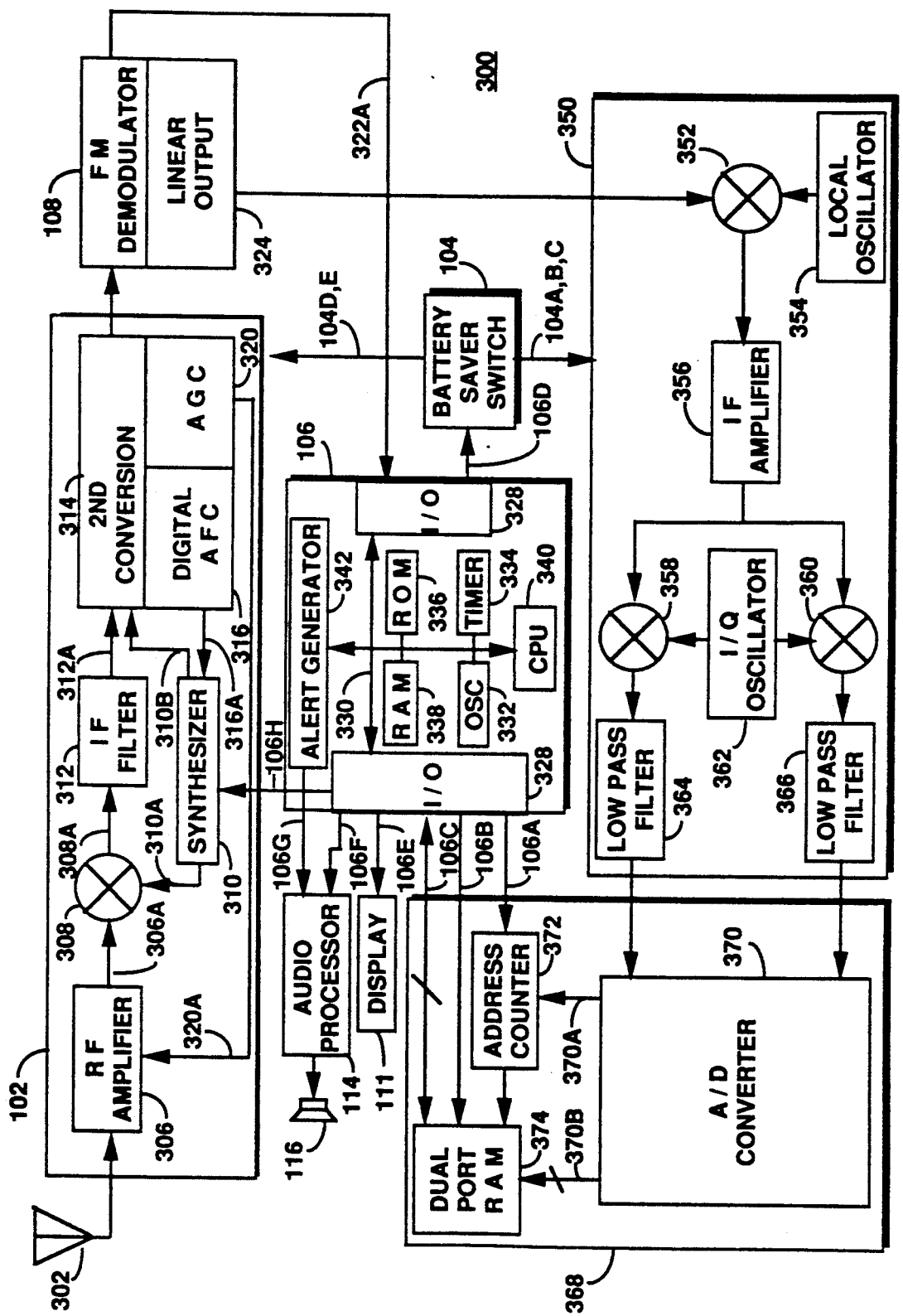
FIG. 3 is an expanded electrical block diagram of the dual mode communication receiver of the present invention.

FIG. 3 is an expanded electrical block diagram which will be used to describe the receiver operation of the dual mode communication receiver of the present invention. The transmitted information signal, modulated in the FM modulation format, or in a linear modulation format, is intercepted by the antenna 302 which couples the information signal to the receiver section 102, and in particular to the input of the radio frequency (RF) amplifier 306. The message information is transmitted on any suitable RF channel, such as those in the high band, UHF band, and 900 MHz band, The RF amplifier 306 amplifies the received information signal, such as that of a signal received on a 930 MHz paging channel frequency, coupling the amplified information signal 306A to the input of the first mixer 308. A first oscillator signal 310A, which is generated in the preferred embodiment of the present invention by a frequency synthesizer 310, also couples to the first mixer 308. The first mixer 308 mixes the amplified information signal 306A and the first oscillator signal 310A, to provide a first intermediate frequency, or IF, signal 308A, such as a 45 MHz IF signal, which is coupled to the input of the first IF filter 312. It will be appreciated that other IF frequencies can be utilized as well, especially when other paging channel frequencies are utilized. The output of the IF filter 312 which is the on-channel information signal 312A, is coupled to the input of the second conversion section 314, which will be described in further detail below. The second conversion section 314 mixes the on-channel information signal 312A to a lower intermediate frequency, such as at 455 KHz, using a second oscillator signal 310B, which is also generated by the synthesizer 310. The second conversion section 314 amplifies the resultant intermediate frequency signal, to provide a second IF signal which is suitable to be coupled to either the FM demodulator section 108, or to the linear output section 324.

Receiver section 304 operates in a manner similar to a conventional FM receiver, however, unlike a conventional FM receiver, the receiver section 304 of the present invention also includes an automatic frequency control section 316 which is coupled to the second conversion section 314, and which appropriately samples the second IF signal to provide a frequency correction signal 316A which is coupled to the frequency synthesizer 310 to maintain the receiver tuning to the assigned channel. The maintenance of receiver tuning is especially important for the proper reception of the high speed data information which is transmitted in the linear modulation format. The use of a frequency synthesizer to generate the first and second oscillator frequencies enables the operation selection of the receiver on multiple operating frequencies, selected such as by code memory programming. It will be appreciated that other oscillator circuits, such as fixed frequency oscillator circuits which can be adjusted by a frequency correction signal from the automatic frequency control section 316, can be utilized as well.

An automatic gain control 320 is also coupled to the second conversion section 314 of the dual mode receiver of the present invention. The automatic gain control 320 samples the second IF signal, providing a gain correction signal 320A which is coupled to the RF amplifier 306 to maintain a predetermined gain for the RF amplifier 306. The gain correction signal also couples to the second conversion section 314 to maintain a predetermined gain for the second conversion section 314. The maintenance of the gain of the RF amplifier 306 and the second conversion section 314 is required for proper reception of the high speed data information transmitted in the linear modulation format, and further distinguished the dual mode receiver of the present invention from a conventional FM receiver.

When the message information is transmitted in the FM modulation format, the second IF signal is coupled to the FM demodulator section 108, as will be explained in detail below. The FM demodulator section 108 demodulates the second IF signal in a manner well known to one of skill in the art, to provide a recovered data signal 108A which is a stream of binary information corresponding to the received address and message information transmitted in the FM modulation format. The recovered data signal 108A couples to the input of a microcomputer 106, which functions as a decoder and controller, through a single data input line of input/output port, or I/O port 328. The microcomputer 106 provides complete operational control of the communication receiver 300, providing such functions as decoding, message storage and retrieval, display control, and alerting, just to name a few. The microcomputer 106 is preferably a single chip microcomputer, such as the MC68HC05 microcomputer manufactured by Motorola, and includes a CPU 340 for operational control. An internal bus 330 connects each of the operational elements of the microcomputer 106. I/O port 328 (shown split in FIG. 3) provides a plurality of control and data lines providing communications to microcomputer 106 from external circuits, such as the battery saver switch 104, audio processor 114, a display 111, and digital storage 368. A timing means, such as timer 334 is used to generate the timing signals required for the operation of the communication receiver, such as for battery saver timing, alert timing and message storage and display timing. Oscillator 332 provides the clock for operation of CPU 340, and provides the reference clock for timer 334. RAM 338 is used to store information utilized in executing the various firmware routines controlling the operation of the communication receiver 300, and can also be used to store short messages, such as numeric messages. ROM 336 contains the firmware routines used to control the microcomputer 106 operation, including such routines as required for decoding the recovered data signal 322A, battery saver control, message storage and retrieval in the digital storage section 368, and general control of the pager operation and message presentation. An alert generator 342 provides an alerting signal 106G in response to decoding the FM modulated signalling information. A code memory 110 (not shown in FIG. 3) couples to microcomputer 106 through the I/O port 328. The code memory is preferably an EEPROM (Electrically Erasable Programmable Read Only Memory) which stores one or more predetermined addresses to which communication receiver 300 is responsive.

When the FM modulated signaling information is received, it is decoded by the microcomputer 106, functioning as a decoder in a manner well known to one skilled in the art. When the information in the recovered data signal 322A matches any of the stored predetermined addresses, the subsequently received information is decoded to determine if additional information is directed to the receiver which is modulated in the FM modulation format, or if the additional information is modulated in the linear modulation format. When the additional information is transmitted in the FM modulation format, the recovered message information is received and stored in the microcomputer RAM 338, or in the digital storage section 368, as will be explained in further detail below, and an alerting signal 106G is generated by alert generator 342. The alerting signal 106G is coupled to the audio processing circuit 344 which drives a transducer 346, delivering an audible alert. Other forms of sensible alerting, such as a tactile or vibrating alert, can also be provided to alert the user as well.

When additional information is to be transmitted in the linear modulation format, the microcomputer 106 decodes the pointer information. The microcomputer 106 maintains the operation of monitoring and decoding information transmitted in the FM modulation format, until the end of the current batch, at which time the supply of power is suspended to the receiver until the next assigned batch, or until the batch identified by the pointer is reached, during which high speed data is transmitted. The microcomputer 106, through I/O port 328 generates a battery saving control signal 106D which couples to battery saver switch 104 to suspend the supply of power to the FM demodulator 108, and to supply power to the linear demodulator 112, including linear output section 324, the quadrature demodulator 350, and the digital storage section 368, as will be described in detail below.

The second IF output signal, which now carries the high speed data information is coupled to the linear output section 324. The output of the linear output section 324 is coupled to the quadrature detector 350, specifically to the input of the third mixer 352. A third local oscillator also couples to the third mixer 352, which is preferably in the range of frequencies from 35-150 KHz, although it will be appreciated other frequencies may be utilized as well. The signal from the linear output section 324 is mixed with the third local oscillator signal 354, producing a third IF signal at the output of the third mixer 352, which is coupled to a third IF amplifier 356. The third IF amplifier is a low gain amplifier which buffers the output signal from the input signal. The third output signal is coupled to an I channel mixer 358 and a Q channel mixer 360. An I/Q oscillator 362 provides quadrature oscillator signals at the third IF frequency which are mixed with the third output signals in the I channel mixer 358 and the Q channel mixer 360, to provide baseband I channel signals and Q channel signals at the mixer outputs. The baseband I channel signal is coupled to low pass filter 364, and the baseband Q channel signal is coupled to low pass filter 366, to provide a pair of baseband audio signals which represent a stream of information symbol pairs corresponding to the encoded high speed data information.

The stream of information symbol pairs are coupled to the digital storage section 368, in particular to the inputs of an analog to digital (A/D) converter 370. The A/D converter 370 samples the pair of information symbols at a rate at least twice the highest frequency component (in Hz) at the output of 364 and 366. For three kilohertz voice information encoded on the I and Q channels, the sampling rate is preferably six kilohertz per I and Q channel, or twelve kilohertz in total. It will be appreciated, the data sampling rate indicated is for example only, and other sampling rates may be used depending upon the rate at which the message information is originally encoded.

During the batch during which the high speed data is transmitted, the microcomputer 106 provides a count enabling signal 106A which is coupled to the address counter 372. The A/D converter 370 is also enabled to allow sampling of the information symbol pairs. The A/D converter 370 generates high speed sample clock signals 370A which are used to clock the address counter 372 which in turn sequentially generates addresses for loading the sampled information symbol pairs into a dual port random access memory 374 through data lines 370B. The information symbol pairs which have been loaded at high speed into the dual port RAM 374 in real time, are processed by the microcomputer 106 after all high speed data has been received, thereby producing a significant reduction in the energy consumed by not requiring the microcomputer 106 to process the information in real time. The microcomputer 106 accesses the stored information symbol pairs through data lines 106C and address lines 106B, and in the preferred embodiment of the present invention, processes the information symbol pairs to generate either ASCII encoded information in the case of alphanumeric data having been transmitted, or CVSD encoded data in the case voice data was transmitted. Other data formats, such as a BCD data format for numeric messages or LPC encoded data format for voice messages, may be utilized as well. The ASCII encoded or CVSD encoded data is stored in the dual port RAM until the information is requested for presentation by the communication receiver user. The stored ASCII encoded data is recovered by the user using switches (not shown) to select and read the stored messages. When the stored ASCII encoded message is to be read, the user selects the message to be read and actuates a read switch which enables the microcomputer 106 to recover the data, and to present the recovered data 106E to a display 111, such as a liquid crystal display. When a CVSD encoded message is to be read, the user selects the message to be read and actuates the read switch which enables the microcomputer 106 to recover the data from the dual port RAM, and to present the recovered data 106E to the audio processor 114 which functions as a CVSD decoder, converting the digital voice information into an analog voice signal which is coupled to a speaker 116 for presentation of the voice message to the user. The microcomputer 106 can also generate a frequency selection signal 106H which is coupled to frequency synthesizer 310 to enable the selection of different operating frequencies as described above.

Figure 4:
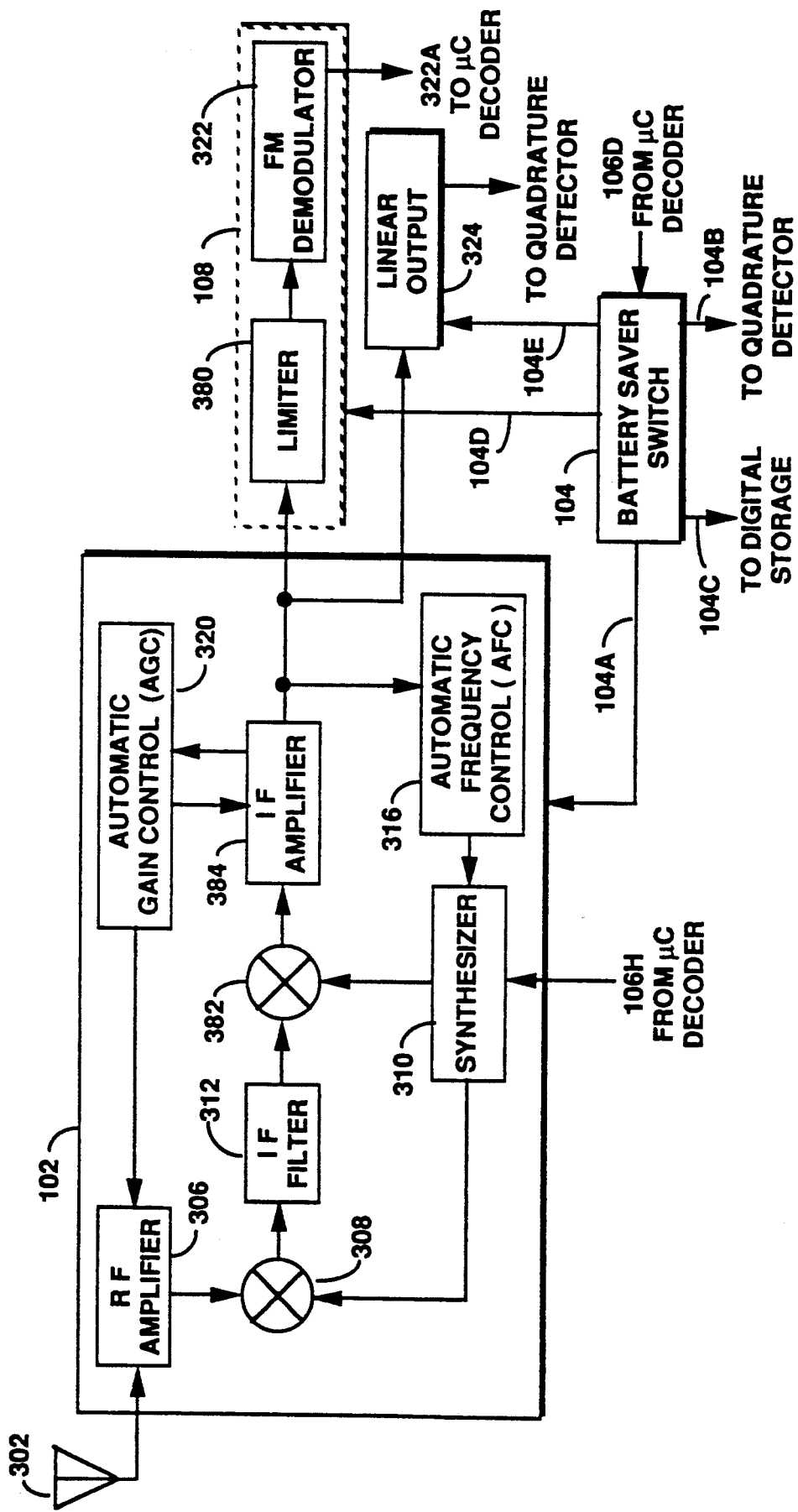
FIG. 4 is an electrical block diagram showing details of the battery saving features of the dual mode communication receiver of the present invention.

FIG. 4 is an electrical block diagram showing details of the battery saving features of the dual mode communication receiver of the present invention. The microcomputer 106 controls the battery saving operation of the communication receiver through battery saver controls signals 106D coupled to the battery saver switch 104. The battery saver switch 104 enables power to be selectively supplied to the receiver section 102 via receiver supply line 104A, to the quadrature detector 350 via quadrature detector supply line 104B, to the digital storage section 368 via digital storage supply line 104C, to the FM demodulator section 108 which includes a data limiter 380 coupled to an FM demodulator 322 via FM demodulator supply line 104D, and to the linear output section 324 via linear output supply line 104E. Elements for selectively switching the supply of power to the each of the receiver sections are well known, and include such switching devices as transistor switches and switched current source references, just to name a few. The microcomputer 106 controls the supply of power to the receiver section 102 which includes such elements as the RF amplifier 306, the first mixer 308, the frequency synthesizer 310, the IF filter 312, the second mixer 382, the second IF amplifier 384, the automatic gain control section 320, and the automatic frequency control section 316, and to the FM demodulator 108 during the transmission of FM modulated message information. The microcomputer 106 also controls the supply of power to the receiver section, the linear demodulator and the digital storage during the transmission of linearly modulated message information. The microcomputer 326 also controls the supply of power to the the digital storage section during the processing of the stored high speed message information, and during the reading of the stored message. In summary, the battery saver switch 104 under the control of the microcomputer 106, supplies power only to those circuits which are currently utilized in the receiving or processing of information, thereby minimizing the energy consumption of the battery.

Figure 5A:
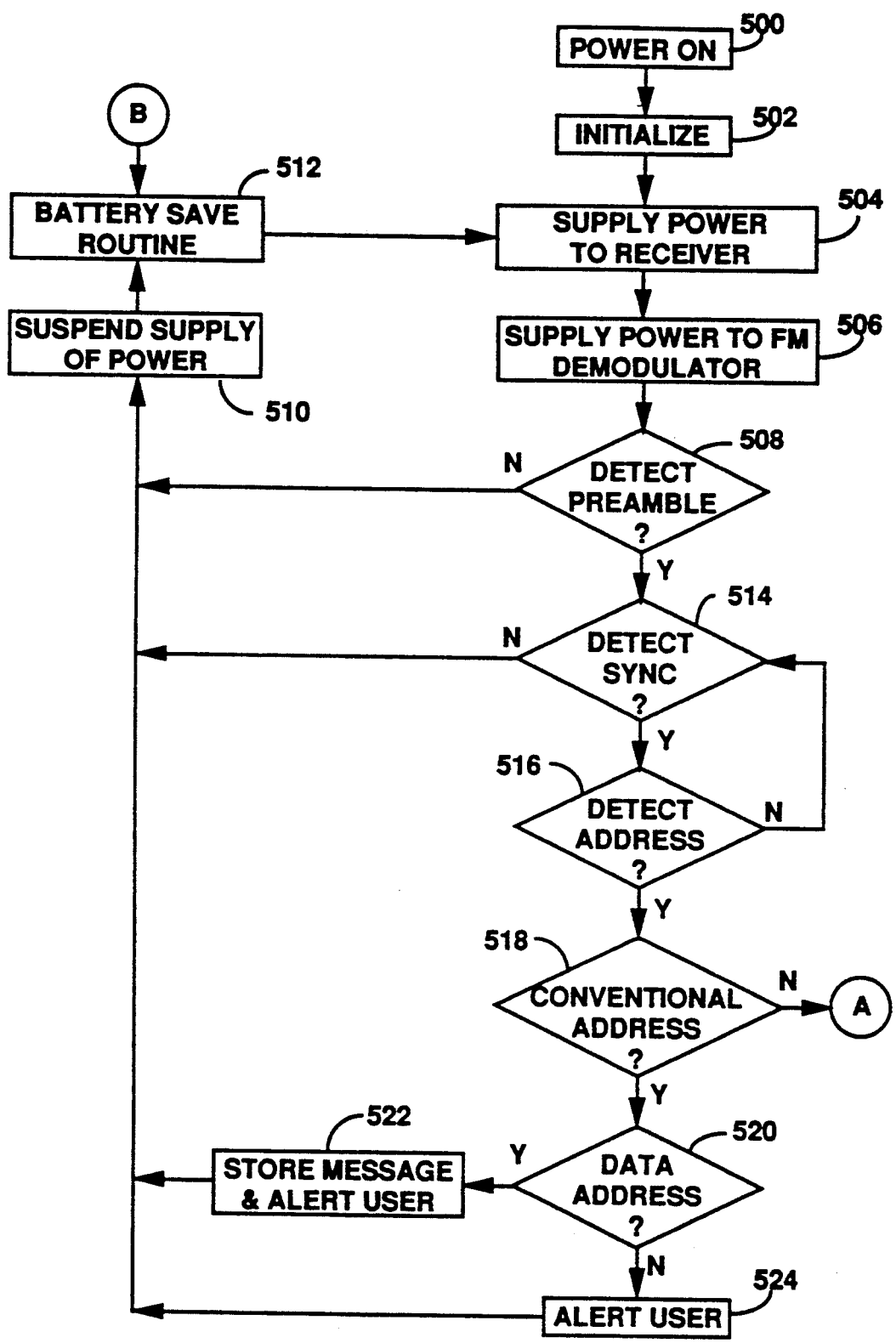
FIGS. 5A and 5B are flow charts describing the operation of the dual mode communication receiver of the present invention.
Figure 5B:
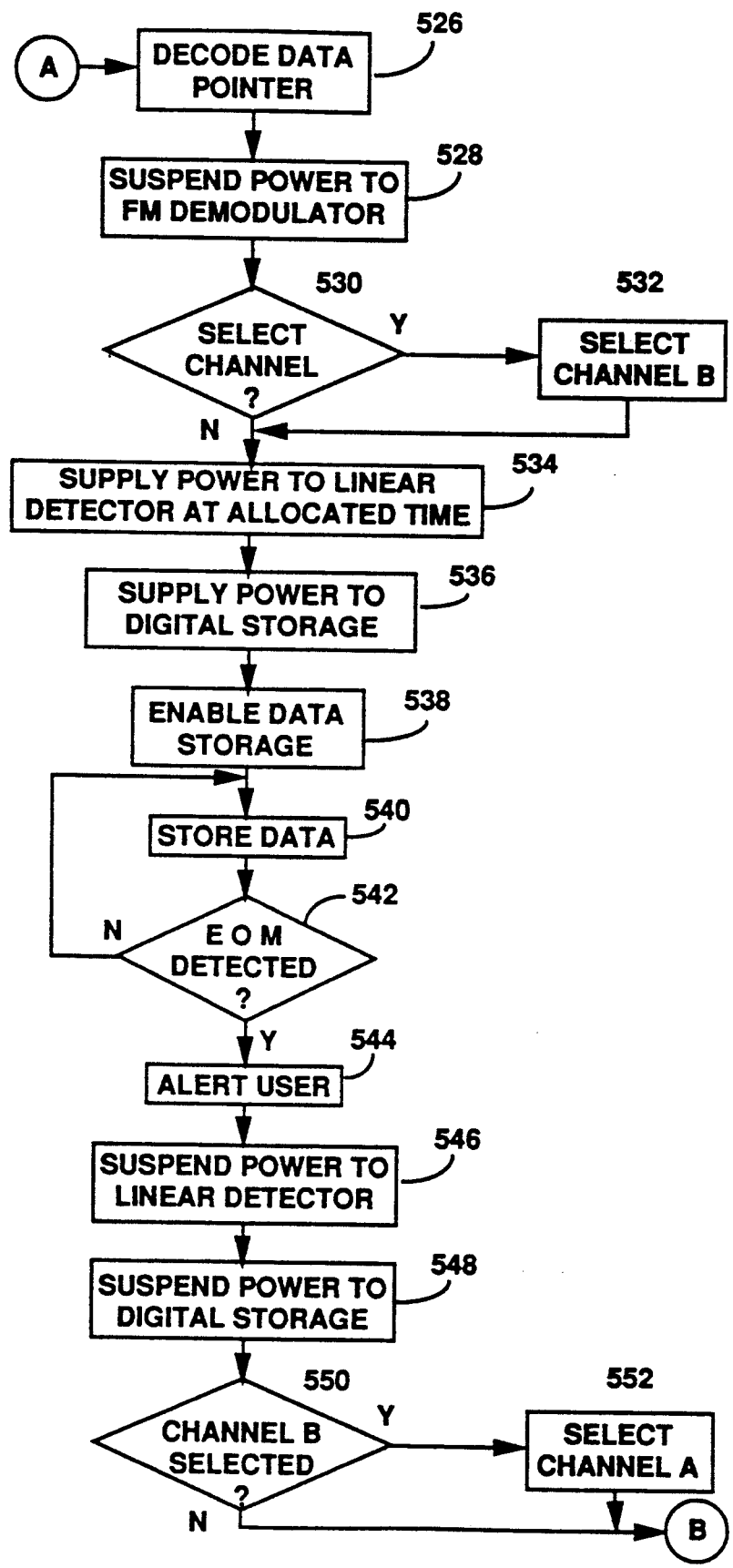

FIGS. 5A and 5B are flow charts describing the operation of the dual mode communication receiver of the present invention. Referring to FIG. 5A, when the user turns power on to the receiver, at step 500, the microcomputer is initialized, at step 502, enabling the battery saving routine. Power is supplied to the receiver, at step 504, and is also supplied to the FM demodulator section, at step 506 to begin the preamble search and acquisition routine. The decoder monitors the information received on the channel, searching for a preamble signal, at step 508, or some other signal by which bit synchronization can be obtained. When a preamble signal, or other signal is not detected within a predetermined search window time interval, at step 508, the microcomputer suspends the supply of power to the receiver and to the FM demodulator, at step 510, and returns to the battery saving routine, at step 512, until the next time interval during which power is again supplied to the receiver and to the FM demodulator.

When preamble is detected, at step 508, and bit synchronization is obtained, in a manner well known in the art, the microcomputer begins the synchronization code word acquisition routine, at step 514. When the synchronization code word is not detected within a predetermined period of time, at step 514, the microcomputer suspends the supply of power to the receiver and to the FM demodulator, at step 510, and returns to the battery saving routine, at step 512, until the next time interval during which power is again supplied to the receiver and to the FM demodulator.

When the synchronization code word is detected, at step 514, corresponding to the batch to which the receiver is assigned, the microcomputer monitors the received address and message information, in order that any addresses and messages directed to the receiver can be detected, at step 516. When an address is not detected within the current batch, the microcomputer monitors the received signal for the synchronization code word, at step 514.

When an address is detected, at step 516, the microcomputer evaluates the next received code word, at step 518 to determine if the message information being transmitted is low speed or high speed message information. When the information transmitted is low speed message information, the microcomputer recalls information from the code memory identifying the received address as either a data address, or a tone only address, at step 520. When the address is a data address, at step 520, the message information following the address is stored, at step 522, and the user is alerted to indicate a message was received. When the address is identified as a tone only address, at step 520, the user is alerted to indicate a page was received. After having received and processed the message, at steps 522, or 524, the microcomputer returns to the battery saving routine, suspending the supply of power to the receiver, at step 510, when no other information is to be received in the current batch.

When the information received in the first modulation format indicates a high speed data message is to be received in the second modulation format, at step 518, the microcomputer decodes the data pointer, at step 526 of FIG. 5B. When the end of the current batch is detected, the supply of power to the FM demodulator is suspended, at step 528. The microcomputer determines if the high speed message information is transmitted on the second channel, at step 530. When the high speed message is transmitted on a second channel, the second channel is selected at step 532. When a second channel is not selected at step 530, or is selected at step 532, power is next supplied to the linear demodulator during the batch indicated by the pointer, at step 534, and to the digital storage section, at step 536. The microcomputer provides an enable signal to the address counter and to the D/A converter, at step 538, which enables the high speed sampling and storage of the received data, at step 540. When an end of message (EOM) character is received, or after a predetermined number of message bits have been received, at step 540, the user is alerted that a message has been received, at step 544. The microcomputer suspends the supply of power to the linear demodulator, at step 546. Power is maintained to the digital storage section during which time the received high speed data is processed. Upon the completion of the processing of the high speed message information, the supply of power is then suspended to the digital storage section, at step 548. The microcomputer determines if a second channel was selected for receiving the high speed message information at step 550. When a second channel was selected, at step 550, the microcomputer reselects the first channel at step 552. When the first channel was selected at steps 550 or 552, the microcomputer returns to the normal battery saving routine, at step 512 of FIG. 5A.

A dual mode receiver has been described which is capable of receiving addresses and messages which are transmitted in an FM modulation format, and further which is capable of receiving high speed data messages which are transmitted in a linear modulation format on either the same or a different radio frequency channel. The dual mode receiver includes a battery saving function which individually controls the supply of power to the FM demodulator, the linear demodulator, and to the digital storage section, thereby minimizing the supply of power being consumed during normal receiver operation in the FM modulation mode. When high speed message information is being received, the digital storage section samples and stores the high speed message information in real time, after which the stored message information is processed by the microcomputer decoder to prepare the information for display.

While specific embodiments of this invention have been shown and described, further modifications and improvements will occur to those skilled in the art. All modifications which retain the basic underlying principles disclosed and claimed herein are with the scope and spirit of the present invention.

We claim:

1. A dual mode communication receiver, comprising:
   means for receiving information transmitted on a common channel in a first and second modulation format;
   first means for detecting the information transmitted in the first modulation format on the common channel; and
   second means, responsive to the information detected in the first modulation format, for detecting the information transmitted in the second modulation format.

2. The dual mode selective call receiver according to claim 1, wherein the first modulation format is frequency shift keyed FM modulation.

3. The dual mode communication receiver according to claim 1, wherein the second modulation format is a linear modulation format.

4. The dual mode communication receiver according to claim 3, wherein the linear modulation format is spectrally efficient digital modulation.

5. The dual mode communication receiver according to claim 3, wherein the linear modulation format is QAM modulation.

6. The dual mode communication receiver according to claim 2 wherein the information transmitted in the first modulation format includes selective call address information, and wherein said dual mode communication receiver further comprises:
   means for decoding at least one predetermined address to which the communication receiver is responsive; and
   means for generating and delivering an alert signal when the address information decoded matches the predetermined address information stored.

7. The dual mode communication receiver according to claim 1, wherein the information transmitted in the first modulation format is transmitted in a first signaling format.

8. The dual mode communication receiver according to claim 1, wherein the information transmitted in the second modulation format is transmitted in a second signaling format.

9. The dual mode communication receiver according to claim 1, wherein the information transmitted in the second modulation format is transmitted on a second receiver frequency.

10. The dual mode communication receiver according to claim 7 wherein the information transmitted in the first modulation format further includes message information, said first receiver means comprises means for demodulating the received message information, and wherein said dual mode communication receiver further comprises:
    means for storing the message information received in the first modulation format when the address information detected matches the predetermined address information stored; and
    means for presenting the stored message information for review.

11. The dual mode communication receiver according to claim 10, wherein the address information received in the first modulation format identifies a tone only page.

12. The dual mode communication receiver according to claim 10, wherein the message information received in the first modulation format is a numeric data message.

13. The dual mode communication receiver according to claim 10, wherein the message information received in the first modulation format is an alphanumeric data message.

14. The dual mode communication receiver according to claim 10 wherein the information transmitted in the second modulation format includes message information, said second receiver means comprises means for demodulating the received message information, and wherein said dual mode communication receiver further comprises:
   means for storing the message information detected in the second modulation format when the address information detected in the first modulation format matches the predetermined address information stored; and
   means for presenting the stored message information.

15. The dual mode communication receiver according to claim 14 wherein said means for presenting comprises a liquid crystal display for displaying the received information.

16. The dual mode communication receiver according to claim 14 wherein said means for presenting comprises:
   processing means for processing the stored message information into an analog voice signal; and
   delivery means for delivering the analog voice signal.

17. The dual mode communication receiver according to claim 14 wherein the message information detected in the second modulation format is an analog signal, and wherein said means for storing comprises:
   converter means for converting the analog message information into digital message information;
   storage controlling means, responsive to the analog message information being converted into digital message information, for controlling the storage of the digital message information into said message storing means.

18. The dual mode communication receiver according to claim 17 wherein said converter means is an analog to digital converter.

19. The dual mode communication receiver according to claim 14 wherein the message information detected in the second modulation format is high speed data information.

20. The dual mode communication receiver according to claim 19 wherein the high speed data information is transmitted at a data rate in excess of 1200 bits per second.

21. The dual mode communication receiver according to claim 14 wherein the message information detected in the second modulation format is voice information.

22. The dual mode communication receiver according to claim 21 wherein the voice information is digitized at a rate of at least 8 kilobits per second.

23. A dual mode communication receiver comprising:
   means for receiving information transmitted on a common channel in a first and second modulation format:
   first means for detecting the information transmitted in the first modulation format on the common channel;
   second means, responsive to the information detected in the first modulation format, for detecting the information transmitted in the second modulation format; and
   third means, for supplying power to said receiving means for enabling the receiving of the information transmitted in the first and second modulation format
   said third means, further for supplying power to said first means for enabling the detecting of the information transmitted in the first modulation format;
   said third means further in response to the information detected in the first modulation format, supplies power to said second means for enabling the detecting of the information transmitted in the second modulation format.

24. The dual mode communication receiver according to claim 23 wherein said third means supplies power to said second receiving means in response to predetermined information being received and detected in the first modulation format, and suspends the supply of power to said first receiving means.

25. The dual mode communication receiver according to claim 23, wherein said first receiving means comprises:
   a receiver section for receiving information transmitted in the first modulation format; and
   a first demodulator means for demodulating the information received in the first modulation format,
   and wherein said third means supplies power to said receiver section and to said first demodulator means for receiving information transmitted in the first modulation format.

26. The dual mode communication receiver according to claim 23, wherein said second receiving means comprises
   a second demodulator means for demodulating the information received in the second modulation format,
   and wherein said third means further supplies power to said receiver section and to said second demodulator means for receiving information transmitted in the second modulation format.

27. The dual mode communication receiver according to claim 23, wherein said second receiving means comprises
   a digital storage means for storing the information received in the second modulation format,
   and wherein said third means further supplies power to said digital storage means for enabling the storing of the information received in the second modulation format.

28. A dual mode communication receiver, comprising:
   means for receiving information transmitted in a FM modulation format and a linear modulation format;
   first means for detecting the information transmitted in the FM modulation format; and
   second means, responsive to the information detected in the FM modulation format, for detecting the information transmitted in the linear modulation format.

29. The dual mode communication receiver according to claim 28, wherein the FM modulation format utilizes frequency shift keying.

30. The dual mode communication receiver according to claim 28, wherein the linear modulation format is spectrally efficient digital modulation.

31. The dual mode communication receiver according to claim 28, wherein the linear modulation format is QAM modulation.

32. The dual mode communication receiver according to claim 28, wherein the information transmitted in the first modulation format is transmitted in a first signaling format.

33. The dual mode communication receiver according to claim 28, wherein the information transmitted in the second modulation format is transmitted in a second signaling format.

34. The dual mode communication receiver according to claim 28, wherein the information transmitted in the second modulation format is transmitted on a second receiver frequency.

35. A dual mode communication receiver comprising:
means for receiving information transmitted in a FM modulation format and a linear modulation format:
first means for detecting the information transmitted in the FM modulation format;
second means, responsive to the information detected in the FM modulation format, for detecting the information transmitted in the linear modulation format; and
third means, for supplying power to said receiving means for enabling the receiving of the information transmitted in the FM and linear modulation formats,
said third means, further for supplying power to said first means for enabling the detecting of the information transmitted in the FM modulation format;
said third means further in response to the information detected in the FM modulation format, supplies power to said second means for enabling the detecting of the information transmitted in the linear modulation format.

* * * * *